United States Patent
Soons et al.

(10) Patent No.: US 12,530,755 B2
(45) Date of Patent: Jan. 20, 2026

(54) METHOD AND APPARATUS FOR IMAGE ENHANCEMENT OF RADIOGRAPHIC IMAGES

(71) Applicant: AGFA NV, Mortsel (BE)

(72) Inventors: Joris Soons, Mortsel (BE); Pieter Vuylsteke, Mortsel (BE)

(73) Assignee: Agfa NV, Mortsel (BE)

( * ) Notice: Subject to any disclaimer, the term of this patent is extended or adjusted under 35 U.S.C. 154(b) by 485 days.

(21) Appl. No.: 18/010,027

(22) PCT Filed: Jun. 4, 2021

(86) PCT No.: PCT/EP2021/064966
§ 371 (c)(1),
(2) Date: Dec. 13, 2022

(87) PCT Pub. No.: WO2021/254792
PCT Pub. Date: Dec. 23, 2021

(65) Prior Publication Data
US 2023/0230213 A1     Jul. 20, 2023

(30) Foreign Application Priority Data

Jun. 16, 2020   (EP) .................................. 20180161

(51) Int. Cl.
*G06T 5/92*     (2024.01)
(52) U.S. Cl.
CPC ...... *G06T 5/92* (2024.01); *G06T 2207/20016* (2013.01)
(58) Field of Classification Search
CPC ... G06T 5/92; G06T 2207/20016; G06T 5/90; G06T 2207/10116; G06T 2207/20064; G06T 2207/30008; G06T 2207/30068
See application file for complete search history.

(56) References Cited

U.S. PATENT DOCUMENTS

2011/0026792 A1*  2/2011  Bertens ............... G06T 5/10
                                                 382/274
2015/0131906 A1*  5/2015  Arai ................... G06T 5/20
                                                 382/167

FOREIGN PATENT DOCUMENTS

| EP | 1933273 A1 | 6/2008 |
| EP | 2232434 B1 | 10/2018 |
| EP | 3822907 A1 | 5/2021 |

OTHER PUBLICATIONS

Jiang, Q., & Kadambe, S. (Nov. 2001). Target enhancement using steerable pyramid decomposition and multi-channel filtering. In Conference Record of Thirty-Fifth Asilomar Conference on Signals, Systems and Computers (vol. 1, pp. 563-567). IEEE. (Year: 2001).*

(Continued)

*Primary Examiner* — Jennifer Mehmood
*Assistant Examiner* — Vaisali Rao Koppolu
(74) *Attorney, Agent, or Firm* — Leydig, Voit & Mayer, Ltd.

(57) ABSTRACT

A processing method for enhancing the image quality of an image, more particularly a digital medical grey scale image, that comprises the steps of a) decomposing an original image into multiple detail images at different resolution levels and/or orientations, b) processing the detail images to obtain processed detail images, c) computing a result image by applying a reconstruction algorithm to the processed detail images, said reconstruction algorithm being such that if it were applied to the detail images without processing, then said original image or a close approximation thereof would be obtained, the processing of the detail images comprises the steps of: d) calculating at least one conjugate detail image, and e) computing at least one value of the processed detail images as a function of said conjugate detail image and said detail images.

20 Claims, 2 Drawing Sheets

(56) References Cited

OTHER PUBLICATIONS

Bonnier et al., "Locally Adaptive Multiscale Contrast Optimization," *IEEE International Conference*, Piscataway, NJ, 1: 949-952 (2005).
Freeman et al., "The Design and Use of Steerable Filters," *IEEE Transactions on Pattern Analysis and Machine Intelligence*, 13(9): 891-905 (1991).
Portilla et al., "A Parametric Texture Model Based on Joint Statistics of Complex Wavelet Coefficients," *International Journal of Computer Vision*, 40(1):49-71 (2000).
Simoncelli et al., "The Steerable Pyramid: A Flexible Architecture for Multi-Scale Derivative Computation," *2nd IEEE International Conference on Image Processing*, Washington, DC, III: 444-447 (1995).
European Patent Office, International Search Report in International Patent Application No. PCT/EP2021/064966, mailed Aug. 6, 2021, 3 pp.
European Patent Office, Written Opinion in International Patent Application No. PCT/EP2021/064966, mailed Aug. 6, 2021, 6 pp.

\* cited by examiner

METHOD AND APPARATUS FOR IMAGE ENHANCEMENT OF RADIOGRAPHIC IMAGES

CROSS-REFERENCE TO RELATED APPLICATIONS

This patent application is the U.S. national phase of copending International Patent Application No. PCT/EP2021/064966, filed Jun. 4, 2021, which claims the benefit of European Patent Application No. 20180161.0, filed Jun. 16, 2020.

TECHNICAL FIELD

The present invention relates to a method and a system for enhancing the image quality of an image that is represented by a digital signal. More in particular it relates to such method for use in a medical radiographic imaging system, such as a digital radiography system.

Background of the Invention

In the ever continuing search for improved algorithms to enhance the image quality of digital images, and especially of digital medical images, different techniques have been tried and tested. The improvements that are sought are obviously better enhancement results (such as better contrast enhancement, noise reduction, . . . ) or improved computing performance with only limited artefacts or distortions.

Commonly images represented by a digital signal such as medical images are subjected to image processing during or prior to displaying or hard copy recording. The conversion of grey value pixels into values suitable for reproduction or displaying may comprise a multi-scale image processing method (also called multi-resolution image processing method) by means of which the contrast of the image is enhanced.

According to such a multi-scale image processing method an image, represented by an array of pixel values, is processed by applying the following steps. First the original image is decomposed into a sequence of detail images at multiple scales or resolution levels and occasionally a residual image. Next, the pixel values of the detail images are modified by applying to these pixel values at least one amplification or conversion. Finally, a processed image is computed by applying a reconstruction algorithm to the residual image and the modified detail images. Variations of this type of processing method have been described in the art, such as for instance in EP 1933273 B1.

There are limits for the behaviour of the amplification or conversion functions. Grey value transitions in the image can be distorted to an extent that the appearance becomes unnatural if the amplification or conversion functions are excessively non-linear. The distortions are more pronounced in the vicinity of significant grey level transitions, which may result in overshoots at step edges and loss of homogeneity in regions of low variance facing strong step edges. The risk of creating artefacts becomes more significant for CT images since they have sharper grey level transitions, e.g. at the interface of soft tissue and contrast media. Consequently, one has to be careful using the multi-scale techniques on CT images.

In European patent EP1933273 B1 a multi-scale contrast enhancement algorithm which results in a contrast enhanced image while preserving the shape of the edge transitions has been described. In one embodiment of the described method, translation difference images of at least one approximation image of the image are created at one or multiple scales or resolution levels. Next, translation difference images are non-linearly modified. Then at least one enhanced centre difference image at a specific scale is computed by combining modified translation difference images at that scale or at a smaller scale. Spatially-localized phenomena derived from the image can be used to create enhanced center difference images. Finally, an enhanced image is computed by applying a reconstruction algorithm to the enhanced center difference images.

This method is, however, disadvantageous since non-linear modification is applied to all translation difference images. Which might result in slow calculation.

In European patent EP2232434, the non-linear modification of the values of the translation difference image is steered by the values of an orientation map which comprises for each pixel on a specific scale a local direction of interest or wherein values of weights that are applied to the images that are summed up to form said amplification image are steered by the values of an orientation map which comprises for each pixel on a scale a local direction of interest.

This method is, however, disadvantageous since non-linear modification is a function of only one local direction at a specific scale. This might be disadvantageous at corners or overlapping structures, often present in radiographic images.

Another multi-scale contrast enhancement algorithm which results in a contrast enhanced image while preserving the shape of the edge transitions has been described in European application EP19209050.4. In one embodiment of this method statistical measures of translation differences are used to enhance image. The last method is fast, but does not incorporate orientation in the conversion function to enhance the image.

The application of the concept of steerable filters to image processing was considered as a promising starting point to optimize image processing algorithms with oriented filters. Oriented filters have been found useful in many vision and image processing tasks. One often needs to apply the same filter, rotated to different angles under adaptive control, or wishes to calculate the filter response at various orientations. A solution has been described in "The Design and Use of Steerable Filters", by Freeman and Adelson, IEEE transactions on pattern analysis and machine intelligence, Vol. 13, No. 9, September 1991, to provide an efficient architecture to synthesize filters of arbitrary orientations from linear combinations of basis filters, allowing one to adaptively "steer" a filter to any orientation, and to determine analytically the filter output as a function of orientation.

In addition, Freeman and Adelson use an approximation of Hilbert transform to form quadrature pairs. As such they can not only analyse the local orientation, but also the local amplitude (or magnitude) and phase.

Freeman and Adelson use the steerable filter to analyse images, and propose following applications: analysing local orientation, angularly adaptive filtering, contour detection and shape-from-shading analysis. They also introduce the concept of the steerable pyramid. The coefficients of the steerable pyramid image transform allow control over orientation analysis over all scales. Other pyramids based on quadrature mirror filters (QMF) or wavelets proved to be efficient for image coding applications. The steerable pyramid is overcomplete, which limits its efficiency but increase the convenience for image processing tasks. The use of steerable filters is optimal for orientation analysis. The simplest example of a steerable basis is a set of N $(N-1)^{th}$- order directional derivatives of a circular symmetric function. In practice, according to theorem 3 of Adelson and Freeman, The Gaussian derivative, which can be written as the product of a Hermitian polynomial and a Gaussian windowing function is suitable as a steerable filter. The set of basis filters are N rotations over $n*\pi/N$ of such an $(N-1)^{th}$ order Gaussian derivatives, with $n \in \{0, 1, \ldots, N-1\}$. Any other rotation can be computed as a linear combination of this set of basis filters. Adelson and Freeman also presented a set of separable steerable filters as basis filters.

As explained in "The steerable pyramid: A flexible architecture for multi-scale derivative computation" by Simoncelli and Freeman, In Proceedings International Conference on Image Processing (Vol. 3, pp. 444-447). IEEE., October 1995, steerable filters are highly constrained if they are used in a steerable pyramid. The steerable pyramid is computed recursively using convolution and decimation operations, and it is "self-inverting". "Self-inverting" means that the matrix corresponding to the inverse transformation is equal to the transpose of the forward transformation matrix, in the wavelet literature, such a transform is known as a tight frame. A major advantage of this steerable pyramid decomposition over other wavelet decompositions is that the sub-bands are translation- and rotation-invariant.

SUMMARY OF INVENTION

The invention provides a method for enhancing the contrast of an electronic representation of an original image X represented by an array of pixel values by processing said image, as said out in independent claim 1. The processing method of the invention comprises the steps of a) decomposing said original image into multiple detail images at different resolution levels and/or orientations, b) processing at least one pixel of said detail images to obtain processed detail images, c) computing a result image by applying a reconstruction algorithm to the processed detail images, said reconstruction algorithm being such that if it were applied to the detail images without processing, then said original image or a close approximation thereof would be obtained, characterized in that said processing of at least one pixel of said detail images comprises the steps of:

d) calculating at least one conjugate detail image, and e) computing at least one value of the processed detail images as a function of said conjugate detail image and said detail images.

The detail images can be calculated from the original image X, by first calculating a pyramid of increasingly lower-resolution images $I_0, I_1, \ldots, I_K$, each being a consecutively downscaled version of its predecessor in said pyramid. Where the resolution of $I_0$ equals X and $I_K$ is a low-pass residual image. And next by applying a convolution to each of said lower-resolution images $I_k \in \{I_0, I_1, I_2, \ldots, I_{K-1}\}$ by a set of N steerable filters $B_n \{B_0, B_1, \ldots, B_{N-1}\}$ to calculate a corresponding set of N detail images $b_{kn} \{b_{k0}, b_{k1}, \ldots, b_{kN-1}\}$ for each scale or resolution. $B_n$ are N rotated versions over $n*\pi/N$ radians of filter $B_O$. As put forward by Freeman and Adelson in the above cited article, a filter is suitable as a steerable filter on condition that any rotation of this filter can be written as a linear combination of the set of basis filters. Here, a convolution of an arbitrary rotation of $B_0$ with $I_k$ can be calculated as a linear combination of $b_{kn}$.

The steerable pyramid is computed recursively using convolution and decimation operations, and it is "self-inverting". A way to design such filters are described in "The steerable pyramid: A flexible architecture for multi-scale derivative computation" by Simoncelli and Freeman, In Proceedings International Conference on Image Processing (Vol. 3, pp. 444-447). IEEE., October 1995. In addition, a high pass residual detail image $h_O$ is also calculated, because the detail images $b_{kn}$ are bandpass filtered results. This can be calculated with filter $H_0$ or as a residual of $X-L_0$.

For reconstruction, the inverse filters $B'_n$ are applied to the detail images. According to the self-inverting property, the inverse filters are derived from the original filters by reflection of their coefficients about the center. The advantage is that the steerable pyramid is self-inverting, and thus the errors introduced in the subbands by quantization or non-linear modification, as proposed in this invention, will not appear as out-of-band distortions upon reconstruction. These filtered detail images are added with an upscaled version of lower-resolution image $I'_{k+1}$ resulting in an image $I'_k$ which is, in case of unmodified detail images, a close approximation of the original $I_k$. The reconstructed image X' is obtained by iteratively repeating the above process for all scales k, starting from the low-pass residual image $I_K$, and finally adding the high pass residual $h_0$. X' will be a close approximation of X in case the detail images $b_{kn}$ and $h_0$ are left unmodified.

The steerable pyramid is an overcomplete representation. "Overcomplete" in this context means that the information that is present in the set of resulting images is redundant. This reduces efficiency for instance for image coding applications but it increases the convenience for image processing tasks.

In addition, conjugate detail images $c_{kn}$ are calculated by convolution of said lower-resolution images $I_k \in \{I_0, I_2, \ldots, I_{K-1}\}$ with a set of N filters $C_n \{C_0, C_1, \ldots, C_{N-1}\}$. Where $C_0$ is the Hilbert transform of $B_0$ and where $C_n$ is a rotation of $C_0$ over $n*\pi/N$.

The invention differs from the state of the art in so far that a complex pyramid with detail images and conjugate detail images is constructed and that the detail images obtained from this complex steerable pyramid are modified before reconstruction. These modifications are non-linear and a function of $b_{kn}$ and $c_{kn}$ and can either selectively amplify or suppress certain aspects of some pixels (i,j) in the detail images. After all detail images are processed, the reconstruction is performed based on the inverse operation applied to all processed detail images $b'_{kn}$ in order to obtain the processed and contrast enhanced version of the grayscale image X'.

In practice one defines an amplitude $A_{kn}$ and phase $\phi_{kn}$ for each quadrature pair $b_{kn}$ and $c_{kn}$, and thus for each scale (k) and orientation (n):

$$A_{kn} = \sqrt{b_{kn}^2 + c_{kn}^2}$$
$$\phi_{kn} = atan\left(\frac{c_{kn}}{b_{kn}}\right)$$

The detail image can be defined as:

$$b_{kn}(i,j) = A_{kn}(i,j) * \cos \phi_{kn}(i,j)$$

According to the invention the amplitude is modified non-linearly into a processed amplitude $A'_{kn}$, so that the processed detail images $b'_{kn}$ are calculated by applying a modified amplitude and keeping the phase:

$$b'_{kn}(i,j) = A'_{kn}(i,j) * \cos \phi_{kn}(i,j)$$

With:

$$A'_{kn}(i,j)=A_{kn}(i,j)g_{kn}(A_{00} \cdots A_{0N-1} \cdots A_{K-1N-1}, \phi_{00} \cdots \phi_{0N-1} \cdots \phi_{K-1N-1})$$

and with $g_{kn}$ being a positive amplification function.

It is the object of the present invention to provide a method for enhancing the image quality of an image, and more particularly in digital medical grayscale images. The present invention is advantageous in that it provides a method for enhancing the quality in a digital image so that the appearance remains natural in comparison to other algorithms where the result of the processing may become excessively non-linear, especially near sharp edges or lines, such that the method reduces the distortions in the vicinity of significant grey level transitions.

Specific examples and preferred embodiments are set out in the dependent claims.

The present invention is generally implemented as a computer program product adapted to carry out the method of any of the claims when run on a computer and is stored on a computer readable medium. The methods of the present invention can be applied for enhancing the image quality of medical images such as digital radiographic images, mammographic images, images obtained by computed tomography etc.

The embodiments of the systems and methods described herein may be implemented in hardware or software, or a combination of both. However, preferably, these embodiments are implemented in computer programs executing on programmable computers each comprising at least one module component which comprises at least one processor (e.g. a microprocessor), a data storage system (including volatile and non-volatile memory and/or storage elements), at least one input device, and at least one output device. For example, and without limitation, the programmable computers (referred to here as computer systems) may be a personal computer, laptop, personal data assistant, and cellular telephone, smart-phone device, tablet computer, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

It is the object of the present invention to provide a method for enhancing the image quality of an image, and more particularly in digital medical grey scale images. Therefore, the coefficients of a steerable pyramid, i.e. the detail images, will be non-linearly modified. The amplification or conversion function depends on scale, orientation, amplitude and phase.

The present invention is advantageous in that it provides a method for enhancing the quality in a digital image so that the appearance remains natural in comparison to other algorithms where the result of the processing may become excessively non-linear, especially near sharp edges or lines, such that the method according to the present invention reduces the distortions in the vicinity of significant grey level transitions.

The present invention is further advantageous in that it provides a method for reducing the noise level in a digital image so that excellent contrast can be achieved without boosting the inherent image noise to a disturbing level.

Further advantages and embodiments of the present invention will become apparent from the following description and drawings.

DESCRIPTION OF EMBODIMENTS

In the following detailed description, reference is made in sufficient detail to the above referenced drawings, allowing those skilled in the art to practice the embodiments explained below.

Figure 1:
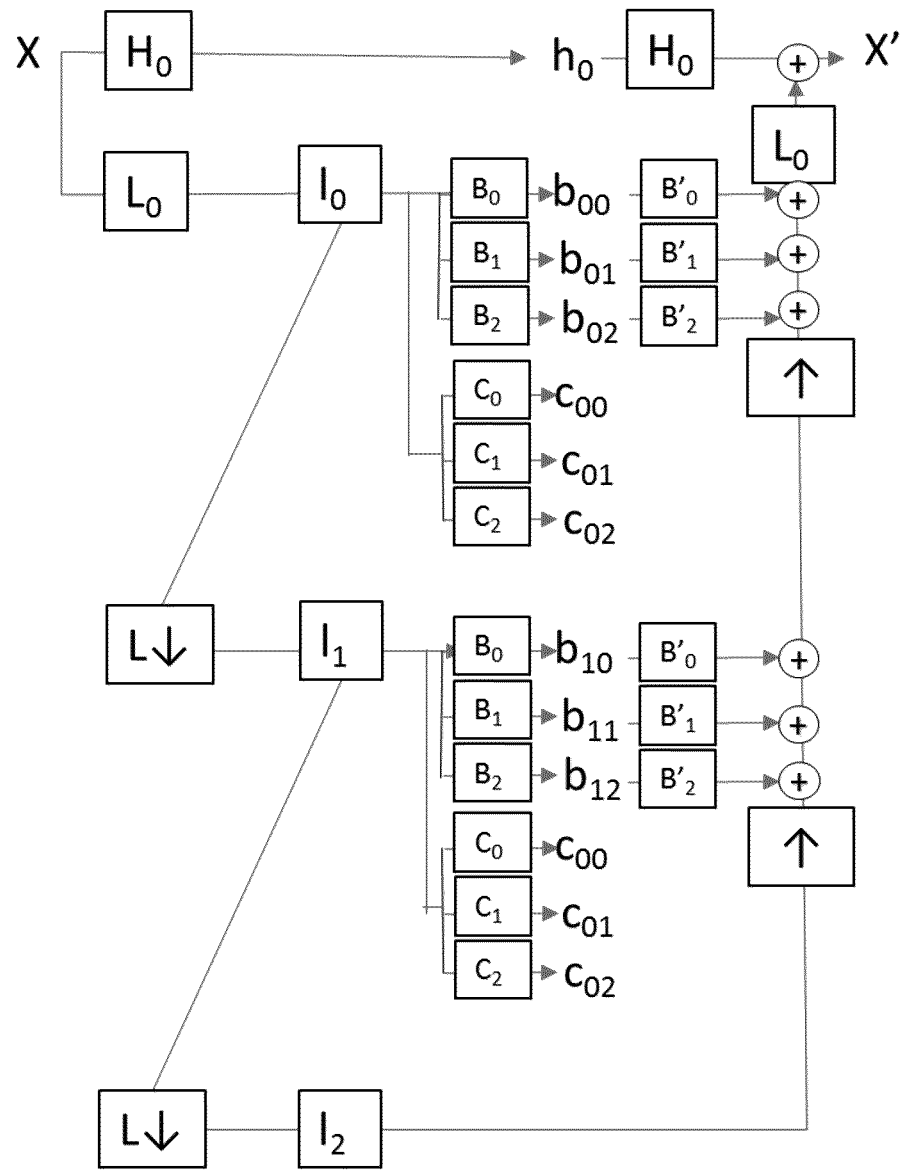
FIG. 1 depicts the steerable pyramid processing method by means of the different filters and images involved. The original grayscale image X is high-pass filtered with filter $H_0$ into high-pass detail image $h_0$ and in low-pass image $I_0$. The (in this case) three detail images $b_{00}$, $b_{01}$, $b_{02}$, can be calculated from the convolution of low-pass image $I_0$ with a set of (in this case) 3 steerable filters $B_n \in \{B_0, B_1, B_2\}$. Similarly, three conjugate images $c_{00}$, $c_{01}$, $c_{02}$, can be calculated from the convolution of low-pass image $I_0$ with a set of (in this case) 3 filters C, $\in \{C_0, C_1, C_2\}$. Further low-pass filtering of $I_0$ and downscaling results in $I_1$ from which in a similar way $b_{10}$, $b_{11}$, $b_{12}$, $c_{10}$, $c_{11}$, $c_{12}$ and $I_2$ can be calculated. In the figure the process stops at residual image $I_2$, but it can be further iterated and finally result in a residual low-pass image $I_k$ ($I_2$ in the example). The detail images $b_{kn}$ are filtered with inverse filter $B'_n \in \{B'_0, B'_1, B'_2\}$. and iteratively added to the upscaled version of $I_{k+1}$. In this way, and by adding high pass detail image $h_0$, the grayscale image X' can be reconstructed.

In the following, a more detailed overview of the preferred embodiments will be explained in more detail. As a first step in the process (reference is made to FIG. 1 with a complete overview of the process), and before the decomposition steps are started, a high-pass filter $H_0$ is applied to the original image X, and results in the high-pass filtered detail image $h_0$. Since detail images $b_{kn}$ are band-pass filtered, this detail image $h_0$ is needed to reconstruct the finest detail. In a preferred embodiment, $H_0$ is chosen in such a way that it is self-inverting, and has to be applied again before reconstruction.

The high-pass filtering step is performed as follows: a) a high-pass filter operator is applied to the original image X, obtaining a high-pass filtered detail image $h_0$ and storing said image $h_0$ in memory, b) a low-pass filter operator $L_0$ is applied to the original image X, obtaining a low-pass filtered image $I_0$ at the original image resolution and storing said low-pass filtered full-resolution image $I_0$ in a memory.

In another embodiment, the high-pass detail image $h_0$ could be obtained as the difference between X and low-pass image $I_0$.

As a second step, the low-pass filtered full-resolution image $I_0$ of the original image X is scaled down into a pyramid of increasingly lower-resolution images $I_1$, $I_2, \ldots, I_K$, each consecutive image being a low-pass filtered (with filter L) and downscaled version of its predecessor in said pyramid. By downscaling the original size image $I_0$, one thus obtains a smaller sized next image $I_1$ that may be further scaled down.

The downscaling of the low-pass filtered image $I_k$ can be performed by any known downscaling algorithm such as bi-linear interpolation, box-scaling, bi-cubic interpolation or alike. A preferred downscaling method for the application in the invention would be one where the spatial resolution is halved along both axes of the image. The amount of pixels of the remaining image would therefore be reduced by 4.

Since a downscaling operation on a digital image can be considered as a smoothing operation, it means that the processing of a downscaled image is equivalent to the processing of a smoothed version of the image. In this respect, it can be understood that the pyramidal decomposition approach leads to the image processing of the same image at different resolution levels or applying to different signal frequencies present in the image.

Figure 2:
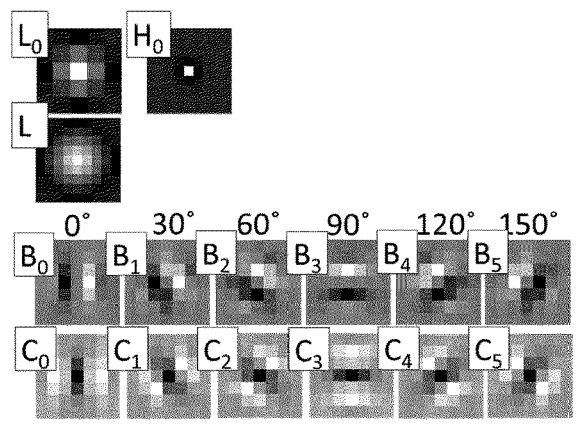
FIG. 2 represents an example of filter sets that may be applied in the method of the invention: low-pass filter $L_0$ and high-pass filter $H_0$ for use at scale 0, low-pass filter L, 6 steerable filters $B_{0-5}$ rotated by steps of 30 degrees and 6 conjugate filters $C_{0-5}$

In a preferred embodiment the filters depicted in FIG. 2 and proposed by Simoncelli and Freeman, combined with reduction of resolution by 2×2 are used.

In a third step, and after the decomposition of the original image into lower resolution images $I_0, I_1, I_2 \ldots I_k$, each resolution version $I_k \in \{I_0, I_1, I_2 \ldots I_{K-1}\}$ is further decomposed by applying a set of N filters $B_n \in \{B_0, B_1, \ldots, B_{N-1}\}$, where $B_n$ is a rotated version of $B_0$ by a rotation of $n/N*\pi$.

This is achieved by applying a convolution of this set of filters to each of the lower resolution images $I_k$. As such for each $I_k$, N detail images $b_{kn}$ are obtained and each of the N filters will gauge the local orientation at lower resolution image $I_k$. As a result, for each detail image $b_{kn}$, k indicates the scale or resolution level, and n the orientation.

In the preferred embodiment, this set of filters are steerable. This implies that, the convolution of $I_k$ with any rotation of $B_0$ can be computed as a linear combination of basis images $b_{kn}$.

The simplest example of a steerable basis is a set of N $(N-1)^{th}$-order directional derivatives of a circularly symmetric function, for example the Gaussian derivatives that are represented by a square pixel kernel of a manageable size. Since the kernels need to be convolved with the image, it speaks for itself that the choice of the kernel size will be a trade-off between accuracy and computing speed. A larger convolution kernel will require more calculation time, but will render more accurate results. Typical higher order Gaussian derivatives need larger kernel sizes. A typical kernel size will be between 5×5, 7×7, 9×9 or 11×11.

The steerable pyramid is computed iteratively using convolution and decimation operations, and it is "self-inverting". A way to design such filters is described in "The steerable pyramid: A flexible architecture for multi-scale derivative computation" by Simoncelli and Freeman, In Proceedings International Conference on Image Processing (Vol. 3, pp. 444-447). IEEE., October 1995. These filters need to be band-limited, have a flat system response and can be used iteratively in order to construct a pyramid. In addition, they need to be steerable and self-inverting.

The derivative order (N-1) can be chosen. Higher order derivatives will result in better orientation resolution but also in larger kernels and more (N) detail images and will consequently require a higher computational effort. For instance, a first order directional derivative will not be able to discriminate between more than two orientations (only steps of 90 degrees), and is thus not useful for enhancing structures with multiple orientations. Since multiple orientations are commonly present in radiographic image, because of its additive nature, higher order derivates are preferred.

In practice, and in a preferred embodiment, a steerable filter-set having 6 orientations with steps of 30 degree rotation are taken, to match the simple cells in the primary visual cortex of the human visual system. An illustration of such a steerable filter set is given in FIG. 2 as $B_{0-5}$.

Figure 3:
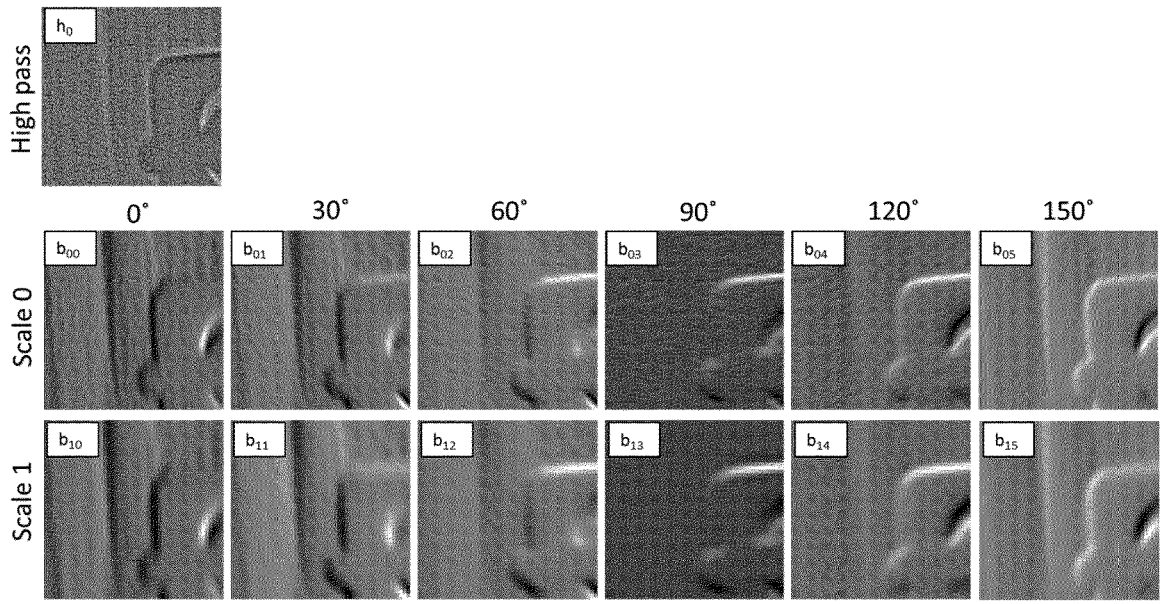
FIG. 3 shows an example of detail images after applying filters from FIG. 2.
Figure 4:
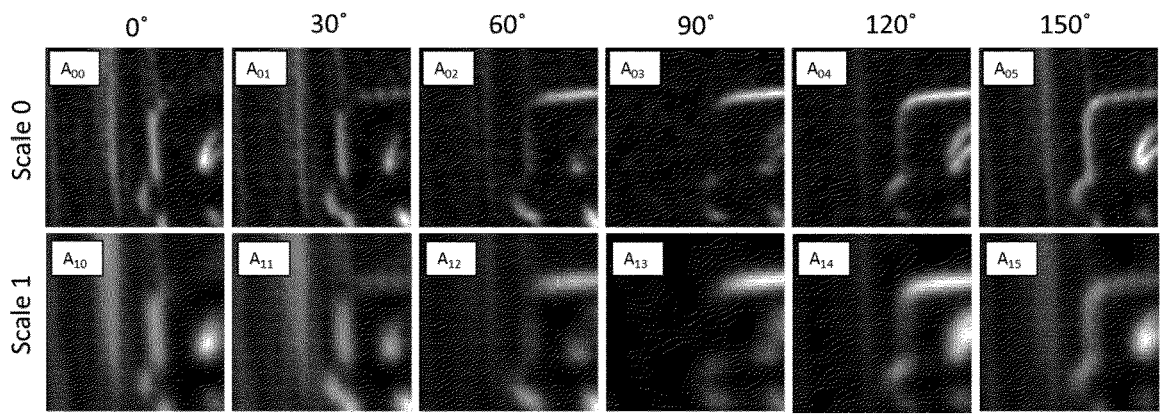
FIG. 4 shows an example of amplitude images by using filters from FIG. 2.

The convolution operation in the example of each of these filters with the lower resolution image $I_k$ results in detail images $b_{k0-5}$ (an equal amount as the number of steerable filters in the set), of which an example is shown in FIG. 3. For each convolution with filters $B_{0-5}$ a corresponding detail image $b_{k0-5}$ is produced. In one embodiment the filters $B_n$ are calculated by a rotation of filter $B_0$ with $n/N*\pi$.

In another embodiment separable steerable filters are used to calculate the rotated version or a close approximation. Convolution with separable basis filters is computational cheaper. For most steerable filters, the basis filters are not x-y separable. According to Freeman and Adelson, Appendix D, for each filter that can be written as polynomial in x and y, there is a x-y separable basis. These basis functions can then be used to steer the filter $B_0$ to any wanted rotation, and more specific to rotations $n/N*\pi$.

At the same time, or in a fourth step, the Hilbert transform of the above steerable filter-set $B_n$ (indicated as $C_{0-5}$ in the example of FIG. 2) is convolved with each lower resolution image $I_k$ to calculate the conjugate detail images $C_{k0-5}$. These conjugate detail images comprise the "imaginary" part of the signal in the image.

In one embodiment, $C_0$ is calculated as Hilbert transform of $B_0$, and $C_n$ are rotated versions over $n/N*\pi$ of $C_0$. In another embodiment, $C_0$ is a polynomial approximation of the Hilbert transform of $B_0$. A set of N+1 steerable filters is created as described by Adelson and Freeman. In this approach, the filter response that corresponds to rotation of $n/N*\pi$ is calculated as a linear combination of a set of (separable) basis filters.

The Hilbert transform is important in signal processing to find the analytic representation of a real-valued signal u(t), or the so-called analytic signal. Specifically, the Hilbert transform of u(t) is its harmonic conjugate v(t), a function of the real variable t such that the complex-valued function u(t)+iv(t) admits an extension to the complex upper half-plane satisfying the Cauchy-Riemann equations.

In practice, by calculating the Hilbert transform of the real part of a digital signal, one can find the (complex valued) analytical signal. The amplitude of this analytical signal corresponds to the 'energy' of the signal because it is not modulated. More specifically, by applying a Riesz transform, which is an N-dimensional generalization of the Hilbert transform, it is possible to find the amplitude, phase and orientation of the signal at a certain scale (or "level") of the image (and not only the real response). Calculating these Riesz transforms at different scales of the image will provide knowledge about the structure in the image at the different scales, which can then be used to modify the detail images accordingly. In this invention the detail images, or the real part of the steerable pyramid, will be modified, based on the calculated amplitude, phase and orientation information, and from which an enhanced image X' can be calculated.

In order to explain this further, a simple example is given to show the importance of phase on image enhancement. For an odd order set of filters $B_n$, the "real" part of the signal, or the detail image $b_{kn}$, will generate more signal for edges than for lines; the detail images $b_{kn}$ thus will mainly comprise signals representing the presence of edges in the lower resolution image $I_k$. For odd order $B_n$, the Hilbert transform $C_n$ has even order, and the "imaginary" part of the signal, at phase $+90°$, $c_{kn}$ will generate more signal for lines than for edges, and the conjugate detail image $c_{kn}$ will mainly comprise signals representing lines. In this way, the phase of our signal will be a measure for the "edgeness" (i.e. the amount of edges present in a pixel) in the lower resolution image. And the amplitude or magnitude of the signal gives a measure for the "energy" in the signal, regardless of whether this signal represents a line or edge. In addition, one can obtain this amplitude and phase for each orientation and scale. As such, one can control the modification of detail image $b_{kn}$ based on the amplitude and 'line-edge-ness' (phase) in each direction, and at finer scales one could for instance enhance edges more than lines because the former are less prone to noise. In a simple and preferred embodiment, the amount of 'line-edge-ness' or phase enhancement is rotationally invariant or independent of its direction.

In a preferred embodiment, amplitude $A_{kn}$ and phase $\phi_{kn}$ for each quadrature pair $b_{kn}$ and $c_{kn}$, and thus for each scale (k) and orientation (n) are calculated as:

$$A_{kn} = \sqrt{b_{kn}^2 + c_{kn}^2}$$

$$\phi_{kn} = \operatorname{atan}\left(\frac{c_{kn}}{b_{kn}}\right)$$

Where the amplitude $A_{kn}$ is a measure for contrast at a certain scale k and orientation n, while the phase $\phi_{kn}$ is a measure for line/edgeness at a certain scale k and orientation n.

The corresponding detail image is equal to:

$$b_{kn}(i,j) = A_{kn}(i,j) * \cos \phi_{kn}(i,j)$$

It is the object of this invention to non-linearly modify the amplitude into a processed amplitude $A'_{kn}$, in order to obtain processed detail images with the same phase but a modified amplitude (contrast):

$$b'_{kn}(i,j) = A'_{kn}(i,j) * \cos \phi_{kn}(i,j)$$

wherein:

$$A'_{kn}(i,j) = f_{kn}(A_{00} \ldots A_{0N-1} \ldots A_{K-1N-1}, \phi_{00} \ldots \phi_{0N-1} \ldots \phi_{K-1N-1})$$

$f_{kn}$ being a conversion function. Typically, $f_{kn}$ is a non-linear function in order to obtain contrast enhancement in the reconstructed image.

Further is it more convenient to define this conversion function as a multiplicative amplification function or a gain function $g_{kn}$:

$$A'_{kn}(i,j) = A_{kn} g_{kn}(A_{00} \ldots A_{0N-1} \ldots A_{K-1N-1}, \phi_{00} \ldots \phi_{0N-1} \ldots \phi_{K-1N-1})$$

In a preferred embodiment this amplification function is translation- and rotation-invariant (such as is the steerable pyramid itself). In other words, translation or rotation of image X has almost no impact and the processing result. Or in other words, any rotation or translation of image X followed by decomposition, modification of the detail images, reconstruction and inverse rotation or translation should have no or almost no effect on enhanced image X'. In another embodiment, the amplification function is translationally invariant and only quasi-rotationally invariant. In this case, there is no or almost no effect on the processing for some specific rotations, for instance steps of 30 degrees.

In a preferred embodiment, this amplification is only depending on the phase and amplitude at the same scale k:

$$g_{kn}(A_{00} \ldots A_{0N-1} \ldots A_{K-1N-1}, \phi_{00} \ldots \phi_{0N-1} \ldots \phi_{K-1N-1}) =$$
$$g_{kn}(A_{k0} \ldots A_{kN-1}, \phi_{k0} \ldots \phi_{kN-1})$$

In another embodiment, $g_{kn}$ is not only depending on amplitude and phase of the scale k. It could also be a function of lower scales. E.g. one could calculate correlation between $A_{kn}$ and $A_{k+1n}$. Pixels at different scale with high correlations could get similar amplification to reduce artefacts.

In practice, this amplification function is split in two or more multiplicative amplification functions. In a preferred embodiment $g_{kn}$ is split in three parts:

$$g_{kn}(A_{k0} \ldots A_{kN-1}, \phi_{k0} \ldots \phi_{kN-1}) = g1_{kn}(A_{kn}) g2_{kn}(\phi_{kn})$$
$$g3_{kn}(A_{k0} \ldots A_{kN-1})$$

Where $g1_{kn}$ is amplitude, $g2_{kn}$ is phase and $g3_{kn}$ is orientation dependent.

In one specific embodiment the first amplitude dependent amplification function can be defined as:

$$g1_{kn} = \frac{f1_{kn}(A_{kn})}{A_{kn}}$$

Wherein $A_{kn}$ is the amplitude for scale k and orientation n and is a measure for contrast, and mapping function $f1_{kn}$ can be defined as for instance illustrated in EP 527 525, p 9 line 35:

$$f1_{kn}: x \to \alpha x^p$$

In this embodiment x will be $A_{kn}$. (rather than being defined as the detail image pixel as in EP 527 525). As such:

$$g_{kn} = \alpha A_{kn}^{p-1}$$

where the power p is chosen within the interval $0 < p < 1$, preferably within the interval $0.5 < p < 0.9$. A comparative evaluation of a large number of computed radiography images of mainly thorax and bony structures by a team of radiologists indicated that $p = 0.7$ is the optimal value in most cases. $\alpha$ specifies a gain factor.

If this multiplicative amplification factor is applied to a detail image $$b_{kn}(i,j) = g_{kn}(A_{kn}(i,j)) * A_{kn} * \cos \phi_{kn}(i,j)$$

then all details with a low amplitude will be boosted relative to the image details which originally have a higher amplitude.

In this respect, the above power function $f1_{kn}: x \to \alpha x^p$ proved to perform very well, but it is clear that an infinite variety of monotonically increasing mapping functions can be found that will enhance subtle details with low amplitude. The main requirement is that $g_{kn}$ is higher, and thus the slope of said mapping function is steeper, in the region of argument values that correspond to low elementary contrast.

In an alternative embodiment, excessive noise amplification can be avoided by using a composite mapping function:

$$f_{kn}: x \to \alpha c^{p_2} \left(\frac{x}{c}\right)^{p_1} \text{ if } x < c$$

$$x \to \alpha x^{p_2} \text{ if } x \geq c$$

where the power $p_2$ is chosen in the interval $0 < p_2 < 1$, preferably $0.5 < p_2 < 0.9$, and most preferably $p_2 = 0.7$ (however the preferred value of $p_2$ highly depends upon the exact kind of radiological examination, and may vary). The power $p_1$ in this equation should not be smaller than $p_2$: $p_1 \geq p_2$, where the cross-over abscissa c specifies the transition point between both power functions.

Decreasing the power $p_2$ will further enhance the contrast of subtle details, but at the same time the noise component will also be amplified. The noise amplification can be limited by choosing a power value $p_1$ larger than $p_2$, preferably 1.0, so that the slope of the mapping function is not extremely steep for the range of very small abscissae.

Ideally the cross-over abscissa c should be proportional to the standard deviation of the noise component (assuming additive noise), so the lowest amplitude details buried within the noise along with the majority of the noise signals will only be moderately amplified, according to the value of the functional part controlled by the power $p_1$, while the detail signals just exceeding the noise level will be amplified much more according to the value of the functional part controlled by the power $p_2$. The decreasing value of the latter functional part still ensures that the subtle details above the noise level are boosted relative to the high amplitude details. In this respect, the above composite power function proved to perform very well, but it is clear that an infinite variety of monotonically increasing mapping functions can be found that will enhance subtle details without boosting the noise to an excessive level.

The main requirement is that $g_{kn}$ is higher, and thus the slope of said mapping function is steeper, in the region of argument values that correspond to low elementary contrast than it is either in the sub-range of very small elementary contrast which mostly correspond to noise, or in the range of the larger elementary contrast.

When all detail images of the decomposition are modified using the same mapping according to one of the above methods, a uniform enhancement over all orientations, and a rotation invariant conversion is obtained. In addition, the enhancement will also be uniform over all scales. In a slightly modified embodiment, where a different mapping function is used at each resolution level e.g. by multiplying one of the above described mapping functions or multiplicative factor with a resolution level-dependent coefficient, it is possible to further increase the sharpness by setting the coefficient corresponding to the finest resolution level to a substantially higher value than the other coefficients as follows:

$$y = A_i F(x)$$

for $i = 0 \ldots K-1$ where $F(x)$ is one of the above described mappings, K is the number of resolution levels, and $A_i$ is a level dependent coefficient, e.g. $A_0 > 1$, and $A_i < 1$ for $1 \leq i \leq K-1$.

In one specific embodiment the second, phase dependent, amplification function can be defined as:

$$g2_{kn}(\phi_{kn}(i,j)) = \frac{1}{n_s}\left(1 - \phi_{kn}(i,j) * \frac{2}{\pi}\right)^2$$

In which $n_s$ is a noise suppression factor. A higher value of $n_s$ results in more attenuation, a lower value in more amplification. $g2_{kn}$ may also be limited to a band of values defined between an upper and lower bound. Especially for those functions with high values. Typical values for lower and upper bound are found to give good results when they are respectively 0.5 and 1. A smaller value of the lower bound (e.g. zero) will result in more attenuation of noise and cartooning like artefacts, while larger values of the upper bound (e.g. 2) will result in increased enhancement of the edges, and overshoot artefacts at the edges. $n_s$ is chosen for each scale. For finer scales, with typically more noise, a larger noise suppression parameter is chosen, for coarser scales a smaller noise suppression is chosen. As an example, the noise suppression parameter $n_s = 1.2$ at scale 0, whereas $n_s = 0.5$ at scale 1 results in natural looking noise suppression in the reconstructed image.

The role of this function is to attenuate detail image pixels representing lines or points, because they are probably, especially at finer scales, noise. Lines have a phase close to 90 degrees, edges at 0 and 180 degrees for odd-ordered $B_n$ filters. The function $g2_{kn}(\ )$ needs to have a lower amplification at a phase of 90 degrees than at 0 degrees. Since it is a multiplicative amplification function, it needs to be positive. In addition, this function also needs to be symmetric around 90 degrees, e.g same amplification has to be found for 90−x as for 90+x. Note that for even-ordered $B_n$ filters these functions need to be shifted with 90 degrees. The above function proved to perform very well, but it is clear that an infinite variety of functions can be found that meet these requirements.

Some examples of such functions are given below:

$$g2_{kn}(\phi_{kn}(i,j)) = \frac{1}{n_s}\frac{1}{\sin(\phi_{kn}(i,j))}$$

$$g2_{kn}(\phi_{kn}(i,j)) = \frac{1}{n_s}\frac{1}{\tan(\phi_{kn}(i,j))^2}$$

$$g2_{kn}(\phi_{kn}(i,j)) = \frac{1}{n_s}\cos(\phi_{kn}(i,j))^2$$

In another embodiment, $n_s$, as well as the lower and upper bound may be calculated based on particular parameters that can be derived from the image data (or detail image data). For instance, histogram values of $b_{kn}(i,j)$ and $c_{kn}(i,j)$ or a combination of such parameters may be applied in a mathematical function to derive the parameters above ($n_s$, and lower and upper bound).

In one specific embodiment the third, orientation dependent, amplification function can be defined as a function:

$$g3_{kn}(A_{k0} \ldots A_{kN-1}) = N\left(\text{if } n == \underset{n}{\operatorname{argmax}} A_{kn}\right)$$
$$= 0(\text{elsewhere})$$

In this way, $A'_{kn}$ will be only non-zero for orientation n with the largest amplitude. This will reduce noise but tends to introduce many artifacts into the image. Especially at corners and overlapping structures. This could be improved in a specific embodiment by using:

$$g3_{kn}(A_{k0} \ldots A_{kN-1}) = (1-\alpha) + N\alpha \left( \text{if } n == \underset{n}{\text{argmax}} A_{kn} \right)$$
$$= (1-\alpha)(\text{elsewhere})$$

In this function the direction with maximum amplitude $$\underset{n}{\arg\max} A_{kn}$$

is calculated for each pixel, and $g3_{kn}$ is larger for n close $$\underset{n}{\arg\max} A_{kn}.$$

In addition, sum of amplification over all directions is kept the same.

With $\alpha$ is a parameter. If $\alpha=0$ than $g3_{kii}$ is identity function, if $\alpha=1$ only orientation with maximum amplitude are kept (i.e. identical to previous embodiment). $\alpha$ controls the amount of 'orientation smoothing', higher $\alpha$ will give more smoothing but more artifacts. These artifacts are more prominent at corners or overlapping structures. $\alpha$ can be different for different scales, typical for finer scales which contain more noise, a higher $\alpha$ is chosen.

In addition, this function is not completely rotationally invariant, but quasi rotationally invariant (only for rotations of $n/N*\pi$). In an improved embodiment, this could be solved by interpolation. In a specific embodiment one could find $n_{max}$ by $\text{argmax}_n A_{kn}$ with sub-integer accuracy by using e.g. quadratic interpolation. In another embodiment, $n_{max}$ is found with sub-integer accuracy by calculating amplitudes for more rotations than only $n*\pi/N$.

$$g3_{kn}(A_{k0} \ldots A_{kN-1}) = (1-\alpha) + N\alpha*(\text{ceil}(n_{max})-n)(\text{if } n == \text{floor}(n_{max}))$$
$$= (1-\alpha) + N\alpha*(n-\text{floor}(n_{max}))(\text{if } n == \text{ceil}(n_{max}))$$
$$= (1-\alpha)(\text{elsewhere})$$

In another embodiment, the steering equation, as for instance given in Freeman and Adelson, can be used instead of interpolation. E.g. for $5^{th}$ order polynomial basis filter:

$$g3_{kn}(A_{k0}\ldots A_{kN-1}) = (1-\alpha) + N*\alpha*k_n(\theta)$$

With: $k_n(\theta) = \frac{1}{6}(2*\cos(\theta-\theta_n) + 2*\cos(3*(\theta-\theta_n)) + 2*\cos(5*(\theta-\theta_n)))$ With: $\theta = n_{max}*\frac{\pi}{N}$ and $\theta_n = n*\frac{\pi}{N}$ It is clear that many functions can be constructed wherein amplitudes in orientations n close to the maximum amplitude orientation $n_{max}$ are more enhanced than other orientations.

In another embodiment, multiple local maximum directions could be found and enhanced. This could be advantageous at locations with multiple orientations, such as crossing structures.

In another embodiment, one could make $\alpha$ a function of the spread of main orientations of $A_{kn}$ (=$\text{argmax}_n A_{kn}$) in a M×M neighborhood around pixel (i,j). The goal is to reduce $\alpha$ at corners and overlapping structures, and thus reduce artefacts. These points typically have neighboring points with many orientations and thus a large spread. Points at clearly oriented lines and edges have a much smaller spread. In one specific and preferred embodiment one could calculate the mean of all orientations in a M×M neighborhood:

$$R = \sqrt{\left(\sum_{i\in M\times M}\left(w_i \sin\frac{2\pi}{N}\arg\max_n A_{kn}\right)\right)^2 + \left(\sum_{i\in M\times M}\left(w_i \cos\frac{2\pi}{N}\arg\max_n A_{kn}\right)\right)^2}$$

With $w_i$ is a weight so $\Sigma_{i\in M\times M}(w_i)=1$ (e.g. for 3×3: $w_i=1/9$)

R equals 1 (R=1) in the case that angles $$\frac{2\pi}{N}\arg\max_n A_{kn}$$

are the same Tor all pixels in M×M. R equals 0 (R=0) in the case that angles are distributed evenly along unit circle.

One could define circular standard deviation stdev as:

$$\text{stdev}=\sqrt{-2*\log(R)}$$

In a specific and preferred embodiment, one could make $\alpha$ dependent on this stdev. If stdev is close to zero, one wants to get maximal focus and thus a large $\alpha$, otherwise a smaller $\alpha$ is preferred. It is clear that many variations exist with similar functionality, in a specific and preferred embodiment:

$$\alpha = \alpha_0 \exp\left(-\frac{\text{stdev}^2}{2*\sigma_0^2}\right)$$

wherein suitable values are:

$$\sigma_0 = \frac{\pi}{N}$$

$\alpha_0=0.5$ at scale 0, 0.15 at other scales.

In another embodiment, $\alpha$ or $\alpha_0$ depends on the gray value of the original image or on a segmentation mask. In medical radiographic images we found that it is advantageous to take different $\alpha_0$ for different tissue types, e.g. a larger $\alpha_0$ for bone. This could be defined by the original grey values, but this is often not a good approach since greyscale values may be similar for different tissue types.

Defining this $\alpha_0$ based on the final or an approximation of the final pixel value is often a better approach. This could be done during a second processing or by reconstruction of scale k+1. Another approach could be to use a segmentation map. This segmentation could be for instance a segmentation map of different tissue types, obtained by for instance a convolutional neural network.

In another specific embodiment one could train or fit a regression for:

$$g_{kn}(A_{00} \ldots A_{0N-1} \ldots A_{K-1N-1}, \phi_{00} \ldots \phi_{0N-1} \ldots \phi_{K-1N-1})$$

One could apply this multiplicative amplification function in combination with other multiplicative amplification functions. In one specific embodiment, $g_{kn}$ is a combination of amplitude dependent amplification function $gl_{kn}(A_{kn})$ and a trained amplification function $gREG_{kn}$. In this way one could use $gl_{kn}$ to modify the amplitude and thus the contrasts (as explained before), and train a function for $gREG_{kn}$ to reduce artifacts and/or noise:

$$g_{kn}(A_{00}\ldots A_{0N-1}\ldots A_{K-1N-1}, \phi_{00}\ldots \phi_{0N-1}\ldots \phi_{K-1N-1}) =$$
$$gl_{kn}(A_{kn}) * gREG_{kn}(A_{00}\ldots A_{0N-1}\ldots A_{K-1N-1}, \phi_{00}\ldots \phi_{0N-1}\ldots \phi_{K-1N-1})$$

In another embodiment, $gREG_{kn}$ is applied to reduce noise and/or artifacts in a processed amplitude ($gREG_{kn}*A_{kn}$), next this processed amplitude is used in another amplification function, e.g. $gl_{kn}$.

$$g_{kn}(A_{00}\ldots A_{0N-1}\ldots A_{K-1N-1}, \phi_{00}\ldots \phi_{0N-1}\ldots \phi_{K-1N-1}) =$$
$$gl_{kn}(gREG_{kn}*A_{kn}) *$$
$$gREG_{kn}(A_{00}\ldots A_{0N-1}\ldots A_{K-1N-1}, \phi_{00}\ldots \phi_{0N-1}\ldots \phi_{K-1N-1})$$

In order to train this regression $gREG_{kn}$, a training set of original images $X(i,j)$ is collected to which artificial noise or artefacts are added to obtain a set of artificial images $X_n(i,j)$. This added noise may be Poisson noise, Gaussian noise, other noise or any combination. Artefacts could be dead pixels/lines, a simulated overexposure, grid lines, ringing artefacts, scatter or other artefacts or any combination thereof. The original images $X(i,j)$ may be a collection of high dose images, phantom images or a lower resolution images with less noise. For each $X(i,j)$ $A_{kn}$ and for each $X_n(i,j)$ $An_{kn}$ is calculated, next $$gREG_{kn} = \frac{A_{kn}}{An_{kn}}$$

is calculated. Next a set of amplitudes and phases ($An_{00}\ldots An_{0N-1}\ldots An_{K-1N-1}$, $\phi n_{00}\ldots \phi n_{0N-1}\ldots \phi n_{K-1N-1}$) are computed for each $X_n(i,j)$ as explained before, and the wanted amplification $gREG_{kn}$ is fitted for each pixel to this set of amplitudes and phases. The goal is to train or fit a function fin such a way that:

$f:(A_{00}\ldots A_{0N-1}\ldots A_{K-1N-1}, \phi_{00}\ldots \phi_{0N-1}\ldots$
$\phi_{K-1N-1}) \rightarrow gREG_{kn}(gREG_{kn}*An_{kn}-A_{kn})^2$ is minimized In an another embodiment, one could not only take the amplitudes and phases for pixel (i,j), but also from other pixels. In a specific embodiment, the pixels in a M×M neighbourhood are taken into account.

In order to train f one can use linear regression, Bayesian networks principal component, support vector machine, neural network, or other machine learning algorithms. This function can then be applied on real data to reduce noise/artefacts.

High-pass filtered detail image $h_0$ may be transformed into an enhanced high-pass filtered detail image $h'_0$, by means of existing methods based on the pixel value, surrounding pixel values or by calculating statistical measures as further described in for instance EP1933273 B1, in European applications EP19202349.7 and EP19209050.4. In another embodiment the values of ($b_{kn}$, $c_{kn}$) can be used to modify this high pass filtered detail image $h_0$. For example, for each pixel, the mean of amplifications at scale 0 ($g_{0n}$)

$$\left(\sum_{n \in N} \frac{g_{0n}}{N}\right)$$

can be taken to amplify detail image pixel values $h_0(i,j)$. In another embodiment, a hybrid method is used, based on existing methods and values of ($b_{kn}$, $c_{kn}$), e.g. amplification can be defined as a weighted average of both techniques. In another embodiment, the processed detail image $h'_0$ will not be calculated and will be left out for reconstruction, because $h_0$ may mainly contain noise.

Low pass residual $I_K$ may be transformed into an enhanced low-pass residual $I'_K$ by means of state of the art. One could for instance use other techniques as for instance described in EP1933273 B1, in European applications EP19202349.7 and EP19209050.4. In a preferred embodiment, the detail images $b_{kn}$ are only calculated for the first scales, because orientation is not very important for lower scales. The low-pass residual $I'_K$ is then enhanced by for instance a multi-scale contrast enhancement algorithm based on statistical measures of translation differences as described in European application EP19209050.4. In another embodiment, the low-pass residual will not be processed at all (identity processing) or will be left out for the reconstruction.

After processing the detail images $b_{kn}$, the processed detail images are obtained as $b'_{kn}$. Subsequently, the processed detail images are convolved with the inverse filter set $B'_n$. Because the steerable pyramid is self-inverting, these inverse filters are derived from the original filters $B_n$ by reflection of their coefficients about the center. In order to reconstruct the processed image X', all processed detail images are summed up (with filtering), including the residual low-pass filtered version $I'_K$, and the high-pass filtered version $h'_0$ (with filtering).

$$X' = I'_K + \sum_{k=0}^{K-1}\sum_{n=0}^{N-1} B'_n \otimes b'_{kn} + H_0 \otimes h'_0$$

The detail images are modified starting from the lowest resolution detail image up to the finest level. Subsequently, the reconstruction algorithm is applied to the modified detail images $b'_{kn}$, again starting with the lowest resolution detail image up to the finest level.

In addition, other enhancements may be applied to $b_{kn}$ prior to or after the application of the conversion operator $g_{kn}(i,j)$.

This could be generalized to more dimensions and especially to 3D images X as proposed by Freeman and Adelson. This can be advantageous in the processing of temporal data (e.g. fluoroscopic radiographic imaging) or 3D data sets such as CT, cone beam CT, digital tomosynthesis and MRI. 3D filters which can be written as $N^{th}$ order polynomials multiplied with a radial windowing function (e.g. Gaussian) can be steered by a set of $(N+1)^2$ basis filters. In order to keep computational effort low, the use of x-y-z separable filters is even more advantageous. Similar to Simoncelli and Freeman such set of steerable filters that are used in a steerable pyramid can be computed. The Hilbert transform is used to calculate conjugate detail images. Detail image and conjugate detail images are used to calculate amplitude and phase for each orientation and nonlinear modification is applied before reconstruction.

The invention claimed is:

1. A method for enhancing the contrast of a digital representation of an original image X represented by an array of pixel values by processing said image, said processing comprising the steps of:
   a) decomposing said original image X into a high-pass filtered detail image $h_0$, a set of detail images $b_{kn}$ at multiple resolution levels (K) and/or multiple orientations (N);
   b) processing at least one pixel (i,j) of at least one of said detail images $h_0$ and $b_{kn}$ to obtain processed detail images $h'_0$ and $b'_{kn}$;
   c) computing a result image X' by applying a reconstruction algorithm to said processed detail images $h'_0$ and $b'_{kn}$;
   d) calculating at least one conjugate detail image $c_{kn}$; and
   e) computing at least one pixel value of the processed detail images $h'_0$ and $b'_{kn}$ as a function of said conjugate detail image $c_{kn}$ and said detail images $h_0$ and/or $b_{kn}$,
   wherein a pixel of said processed detail images is calculated as:

$$b'_{kn}(i,j)=A'_{kn}(i,j)*\cos\phi_{kn}(i,j)$$

wherein $\phi_{kn}$ is a phase detail image, calculated as $$\phi_{kn} = \arctan\left(\frac{c_{kn}}{b_{kn}}\right)$$

wherein $A'_{kn}$ is an amplitude of said processed detail image, calculated as $$A'_{kn}(i,j)=f_{kn}(A_{00}\ldots A_{0N-1}\ldots A_{K-1N-1},\phi_{00}\ldots \phi_{0N-1}\ldots \phi_{K-1N-1})$$

wherein,
   $\{A_{00}\ldots A_{0N-1}\ldots A_{K-1N-1}\}$ is an amplitude of at least one pixel of the set of detail images $b'_{kn}$, and $\{\phi_{00}\ldots \phi_{0N-1}\ldots \phi_{K-1N-1}\}$ is a phase of at least one pixel of the set of detail images $b'_{kn}$,
   and wherein the amplitude of a detail image $A_{kn}$ $\{A_{k0}, A_{k1}, \ldots, A_{kN-1}\}$ is calculated as:

$$A_{kn}=\sqrt{b_{kn}^2+c_{kn}^2}.$$

2. The method of claim 1, wherein the set of detail images $b_{kn}$ are calculated by:
   a) downscaling the original image X into a pyramid of increasingly lower-resolution images $I_0, I_1, \ldots, I_{K-1}$, each being a consecutively downscaled version of its predecessor in said pyramid; and
   b) applying a convolution to each of said images $I_k \in \{I_0, I_1, I_2, \ldots, I_{K-1}\}$ by a set of N filters $B_n\{B_0, B_1, \ldots, B_{N-1}\}$ to calculate a corresponding said set of N detail images $b_{kn}\{b_{k0}, b_{k1}, \ldots, b_{kN-1}\}$, wherein each $B_n$ is a rotated version of filter $B_O$.

3. The method of claim 2, wherein said N filters $B_n$ are steerable filters, in such a way that a convolution of an arbitrary rotation of $B_0$ with said lower-resolution image $I_k$ can be calculated as a linear combination of said detail images $b_{kn}$.

4. The method of claim 2, where said N filters $B_n$ are calculated as a linear combination of steerable filters.

5. The method of claim 2, wherein N is different for each resolution level.

6. The method of claim 1, wherein a conjugate detail image $c_{kn}$ is calculated by downscaling the original image X into a pyramid of increasingly lower-resolution images $I_0, I_1, \ldots, I_{K-1}$, each being a consecutively downscaled version of its predecessor in said pyramid; and
applying a convolution to each of said images $I_K \in \{I_0, I_1, I_2, \ldots, I_{K-1}\}$ by a set of N conjugate filters $C_0, C_1, \ldots, C_{N-1}$.

7. The method of claim 6, wherein the set of N conjugate filters $C_0, C_1, \ldots, C_{N-1}$ are rotations of a Hilbert transform of said filter $B_0$.

8. The method of claim 6, wherein the set of N conjugate filters $C_0, C_1, \ldots, C_{N-1}$ are calculated as a linear combination of steerable filters.

9. The method of claim 1, wherein fin is rotationally invariant.

10. The method of claim 1, wherein $$A'_{kn}(i,j) = f_{kn}(A_{00}\ldots A_{0N-1}\ldots A_{K-1N-1}, \phi_{00}\ldots \phi_{0N-1}\ldots \phi_{K-1N-1}) =$$
$$A_{kn} * g_{kn}(A_{00}\ldots A_{0N-1}\ldots A_{K-1N-1}, \phi_{00}\ldots \phi_{0N-1}\ldots \phi_{K-1N-1})$$

and wherein $g_{kn}$ is multiplicative positive amplification function.

11. The method of claim 10, wherein:

$$A'_{kn}(i,j)=A_{kn}(i,j)g1_{kn}(A_{kn})g2_{kn}(\phi_{kn})g3_{kn}(A_{00}\ldots A_{0N-1}\ldots A_{K-1N-1}, \phi_{00}\ldots \phi_{0N-1}\ldots \phi_{K-1N-1})$$

and wherein $g1_{kn}$, $g2_{kn}$ and $g3_{kn}$ are multiplicative positive amplification functions.

12. The method of claim 11, wherein $g1_{kn}$ is a positive non-linear amplification function with an amplification that gradually decreases with increasing argument values.

13. The method of claim 11, wherein $g2_{kn}$ have a lower amplification for an argument of 90 degrees than for an argument 0 degrees and that it is symmetric around 90 degrees.

14. The method of claim 11, wherein $g2_{kn}(\phi_{kn}(i,j))$ is limited to a band of values defined between an upper and lower limit.

15. The method of claim 11, wherein $g3_{kn}$ is a function fitted to a training set and with $(A_{00}\ldots A_{0N-1}\ldots A_{K-1N-1}, \phi_{00}\ldots \phi_{0N-1}\ldots \phi_{K-1N-1})$ as argument.

16. The method of claim 11, wherein $g3_{kn}(A_{00}\ldots A_{0N-1}\ldots A_{K-1N-1}, \phi_{00}\ldots \phi_{0N-1}\ldots \phi_{K-1N-1})=g3_{kn}(A_{k0}\ldots A_{kN-1})$ and wherein amplification $g3_{kn}$ is larger for orientations n close to $n_{max}$, wherein $n_{max}$ is calculated as the orientation with maximum amplitude.

17. The method of claim 11, wherein a parameter a controls the variation of $g3_{kn}$ for different n.

18. The method of claim 16, wherein $\alpha$ is a function of grayscale, segmentation value, the spread of $n_{max}$ in a M×M neighbourhood or any combination, wherein M is a dimension of the neighborhood.

19. The method of claim 1, wherein said high-pass filtered detail image $h_0$ is non-linear processed by:
   (a) calculating for said pixel, at least one statistical measure for two or more translation difference image pixel values within a neighbourhood of said pixel; and
   (b) modifying the value of said pixel of said processed detail image $h'_0$ as a function of said statistical measure, amplitude and phase of said set of detail images $b_{kn}$ and value of said pixel of said high-pass filtered detail image $h_0$, as follows:

$$h'_0(i,j)=a_0(i,j)h_0(i,j)$$

wherein, $$a_0(i,j)=f_0(A_{kn},\phi_{kn}).$$

20. The method of claim 1, wherein processing at least one pixel of said processed detail images $h'_0$ and $b'_{kn}$ is repeated at least one time for already processed detail image pixels.

* * * * *